(12) United States Patent
Kim

(10) Patent No.: US 6,847,679 B1
(45) Date of Patent: Jan. 25, 2005

(54) APPARATUS AND METHOD FOR COMMUNICATING SIGNAL IN ASYMMETRIC DIGITAL SUBSCRIBER LINE NETWORK BY USING DUAL LINK DISCRETE MULTI-TONE

(75) Inventor: Tong-Sok Kim, Taejon (KR)

(73) Assignee: Korea Telecom, Sungnam-shi (KR)

( * ) Notice: Subject to any disclaimer, the term of this patent is extended or adjusted under 35 U.S.C. 154(b) by 0 days.

(21) Appl. No.: 09/460,458

(22) Filed: Dec. 13, 1999

(30) Foreign Application Priority Data

Dec. 12, 1998 (KR) .......................................... 1998-54745

(51) Int. Cl.[7] .............................. H04B 1/38; H04L 5/16
(52) U.S. Cl. ..................................................... 375/222
(58) Field of Search ................................ 375/222, 395; 370/529, 447, 342

(56) References Cited

U.S. PATENT DOCUMENTS 4,972,408 A  * 11/1990 Le Bihan Herve et al. . 370/529
5,966,377 A  * 10/1999 Murai ......................... 370/342
6,005,896 A  * 12/1999 Maruyama ................... 375/295
6,144,695 A  * 11/2000 Helms et al. ................ 375/222

* cited by examiner

Primary Examiner—Stephen Chin
Assistant Examiner—Curtis Odom
(74) Attorney, Agent, or Firm—Staas & Halsey LLP

(57) ABSTRACT

A modulation/demodulation device for communicating signals in ADSL network. The modulation device includes a unit for generating a control signal based on a predetermined data, and a unit for determining the control signal based on the amounts of the low rate signal and the high rate signal, a unit for receiving a low rate signal and for generating a low rate signal sequence having a first controlled number of bits, based on the control signal, a unit for receiving a high rate signal through terminals LSx and ASx and for generating a high rate signal sequence having a second controlled number of bits, based on the control signal, and a unit for modulating the low rate signal sequence and the high rate signal sequence and for coupling modulated low rate signal sequence and modulated high rate signal sequence, thereby generating a transmission signal.

24 Claims, 3 Drawing Sheets

APPARATUS AND METHOD FOR COMMUNICATING SIGNAL IN ASYMMETRIC DIGITAL SUBSCRIBER LINE NETWORK BY USING DUAL LINK DISCRETE MULTI-TONE

BACKGROUND OF THE INVENTION

1. Field of the Invention

The present invention relates to an apparatus and method for communicating a signal in an asymmetric digital subscriber line (ADSL) network by using dual link discrete multi-tone, more particularly to an apparatus and method for transmitting and receiving a signal in an ADSL network by using a dual link discrete multi-tone in which low rate signals e.g., signals of a plain old telephone service (POTS) and an integrated services digital network (ISDN) are transmitted through a low pass link and high rate signals e.g., a packet and a superframe are transmitted through a high pass link, thereby controlling a traffic.

2. Description of the Prior Art

In general, the ADSL is an asymmetric digital subscriber line having a upstream transmission bandwidth from a subscribe to a telephone central office and a downstream transmission bandwidth from the telephone central office to the subscriber wherein the upstream and the downstream bandwidths are discriminated each other. As for the ADSL, the downstream signal bandwidth is larger than the upstream bandwidth and a high speed signal of about 6 Mbps can be transmitted to the subscriber separated from the telephone central office within a distance of about 4 km.

FIG. 1 is a schematic view for showing a network configuration of the conventional ADSL.

Referring to FIG. 1, the ADSL network stipulated by an ADSL forum comprises an ADSL transmission unit-central (ATU-C) 1 connected to a connection node 7, an ADSL transmission unit-remote (ATU-R) 2 connected to a terminal 8, and splitters 3, 4 respectively connected to a public switched telephone network (PSTN) and a telephone of the subscriber 6. A carrierless AM/PM (CAP) system and a DMT system are representatively known as the modulation/demodulation system of the ADSL network and the DMT system is recommended by the ADSL forum and the American National Standards Institute (ANSI). The DMT system is a kind of the multi-subcarrier transmission system that the inputted signal is divided and transmitted onto the 256 subcarriers. That is, the inputted signal source is divided into partial signals $\alpha_n$ of n numbers at a transmitting-end according to the following mathematical expression (1), and then the transmission signal $X[n]$ can be expressed as the sum of product of the partial signals $\alpha_n$ and an orthogonal function $\phi_n$ corresponding to the subcarrier.

$$X[n] = \alpha_0\phi_0[n] + \alpha_1\phi_1[n] + \alpha_2\phi_2[n] + \ldots + \alpha_{n-1}\phi_{n-1}[n] \quad (1)$$

wherein the orthogonal function $\phi_k[n] = \exp(jk \cdot 2\pi/N \cdot n)$.

At that time, for utilizing a normalized coefficient at a transformation and an inverse transformation, the transmission signal $X[n]$ is expressed as the following mathematical expression (2) in the case that $1\sqrt{N} \cdot a_k$ is used instead of the $\alpha_n$.

$$X[n] = \sum_{k=0}^{n-1} \frac{1}{\sqrt{N}} \cdot a_k \cdot \exp\left(jk \cdot \frac{2\pi}{N} \cdot n\right) \quad (2)$$

Meanwhile, the $a_k$ is calculated from the received $X[n]$ at a receiving-end as the following mathematical expression (3).

$$a_k = \frac{1}{\sqrt{N}} \sum_{n=<N>} X[n] \cdot \exp\left(-jk \cdot \frac{2\pi}{N} \cdot n\right) \quad (3)$$

The ADSL is a high speed data link having one $a_k$ stream of the transmitter and one $a_k$ stream of the receiver. The low speed data and the high speed data are packaged and transmitted through such data links after the low and the high speed data are allocated to a record spaces in the identical superframe or the packet. Hence, the time delay or the service sorting function is demanded for forming a large frame.

As for the frame and format of the data transmitted through the ADSL link, the ADSL forum suggests a packet mode method and a multi-frame mode method. The packet communication mode is divided into a point-to-point protocol (PPP), a protocol data unit (PDU) packet mode and an asynchronous transfer mode (ATM) frame user to network interface (UNI) packet mode. In the multi-frame mode as shown in the following table 1, a downstream ATM signal of below 6 Mbps and an duplex signal of below 640 kbps are mapped onto one data frame, and then one superframe is formed by gathering 68 data frames.

TABLE 1

| channel | transmission ability | accommodation service |
|---|---|---|
| AS0 ... AS3 channel | downstream signal of below 6 Mbps | VOD, high speed one-way ATM |
| LS0 ... LS2 channel | duplex signal of below 640 kbps | duplex ATM, data circuit, ISDN (2 B + D) |

The ATU-C 1 interfaces with the connection node 7 by the limited transmission speed of 2 Mb/s or 155 Mb/s and shares such interface with all the ATU-R which the ATU-C 1 belongs to. Therefore, the traffic bottleneck may occur such as other subscribers use very low traffic or wait for the completion of the high speed data transmission when one subscriber transmits a mass storage file or dynamic picture information.

SUMMARY OF THE INVENTION

Considering the above-mentioned problems, it is an object of the present invention to provide an dual link DTM ADSL transmitter-receiver by a DMT system so as to transmit and receive ISDN or POTS signal through a low pass link and packet mode and frame mode signals through a high pass link after the low and the high pass links are separately configured according to partitioning of a pass bandwidth of a subcarrier.

To achieve the object of the present invention, there is provided an apparatus having a modulation device and demodulation device and for communicating signals in an asymmetric digital subscriber line network, said modulation device comprising: means for generating a control signal based on a predetermined data; means for receiving a low rate signal and for generating a low rate signal sequence having a first controlled number of bits, based on the control signal; means for receiving a high rate signal and for generating a high rate signal sequence having a second controlled number of bits, based on the control signal; and means for modulating the low rate signal sequence and the high rate signal sequence and for coupling modulated low rate signal sequence and modulated high rate signal sequence, thereby generating a transmission signal.

To achieve the object of the present invention, there is provided an apparatus having a modulation device and demodulation device and for communicating signals in an asymmetric digital subscriber line network, said demodulation device comprising: means for generating a control signal based on a predetermined data; means for receiving and demodulating a transmission signal and for generating a low rate signal sequence having a first controlled number of bits and a high rate signal sequence having a second controlled number of bits, based on the control signal; means for receiving the low rate signal sequence and generating a low rate signal; and means for receiving the high rate signal sequence and generating a high rate signal.

To achieve the object of the present invention, there is provided a method for communicating signals applied to an apparatus having a modulation device and demodulation device in an asymmetric digital subscriber line network, the method comprising the steps of: generating a control signal based on a predetermined data; receiving a low rate signal and generating a low rate signal sequence having a first controlled number of bits, based on the control signal; receiving a high rate signal and generating a high rate signal sequence having a second controlled number of bits, based on the control signal; and modulating the low rate signal sequence and the high rate signal sequence and coupling modulated low rate signal sequence and modulated high rate signal sequence, thereby generating a transmission signal.

To achieve the object of the present invention, there is provided a method for communicating signals applied to an apparatus having a modulation device and demodulation device and in an asymmetric digital subscriber line network, the method comprising the steps of: generating a control signal based on a predetermined data; receiving and demodulating a transmission signal and generating a low rate signal sequence having a first controlled number of bits and a high rate signal sequence having a second controlled number of bits, based on the control signal; receiving the low rate signal sequence and generating a low rate signal; and receiving the high rate signal sequence and generating a high rate signal.

To achieve the object of the present invention, there is provided a method for communicating signals in an asymmetric digital subscriber line network, comprising the steps of: generating a first control signal based on a predetermined data; receiving a low rate signal and generating a low rate signal sequence having a first controlled number of bits, based on the first control signal; receiving a high rate signal and generating a high rate signal sequence having a second controlled number of bits, based on the first control signal; modulating the low rate signal sequence and the high rate signal sequence and coupling modulated low rate signal sequence and modulated high rate signal sequence, thereby generating a transmission signal, transmitting the transmission signal; receiving and demodulating a transmission signal and generating a low rate signal sequence having the first controlled number of bits and a high rate signal sequence having the second controlled number of bits, based on a second control signal; generating a second control signal based on a predetermined data; receiving the low rate signal sequence and generating a low rate signal; and receiving the high rate signal sequence and generating a high rate signal.

The present invention comprises the low and the high data links which are separated each other so that the ADSL of the present invention can accommodate the PTOS signal limited by the time according to the DMT-typed modulation demodulation process that the signals of the PTOS and the ISDN are transmitted and received through the low pass link and the packet and the multi frame are transmitted and received through the high pass link. Also, the present invention can control the ADSL traffic by adjusting the value of the dividing key.

BRIEF DESCRIPTION OF THE DRAWINGS

The above object and advantages of the present invention will become more apparent by describing in detail the preferred embodiment thereof with reference to the attached drawings, in which.

DETAILED DESCRIPTION OF THE INVENTION

Hereinafter, the preferred embodiment of the present invention will be explained in more detail with reference to the accompanying drawings.

Figure 1:
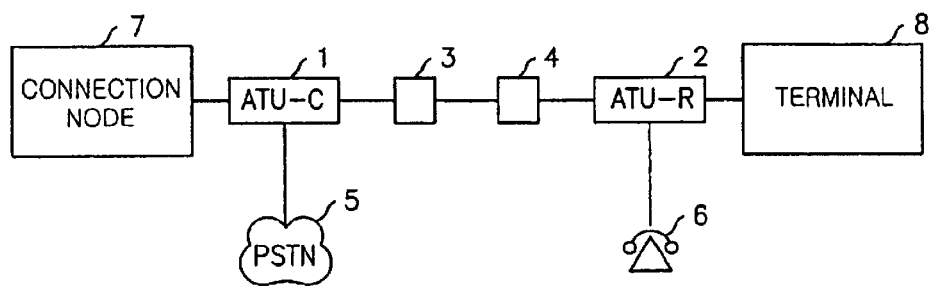
FIG. 1 is a schematic view for showing a conventional network for an asymmetric digital subscriber line.
Figure 2:
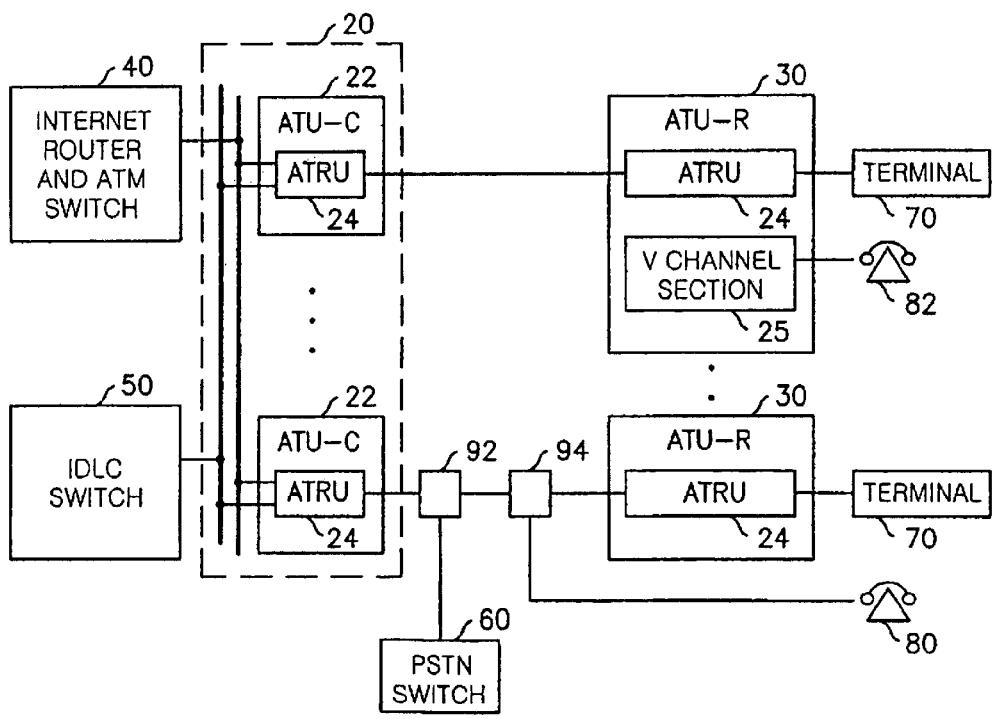
FIG. 2 is a schematic view for showing a network configuration for an asymmetric digital subscriber line by using an asymmetric digital subscriber line transmitter/receiver according to the present invention.

FIG. 2 is a schematic view for showing a network configuration for an asymmetric digital subscriber line by using a dual link DMT ADSL transmitter/receiver according to the present invention.

Referring to FIG. 2, the ADSL network comprises an ADSL adapter 20 having 20 to 30 numbers of the ATU-C 22 mounted as a board type, an Internet router and ATM switch 40 and an integrated digital loop carrier (IDLC) switch 50 which are respectively those ATU-C 22, a plurality of ATU-R 30 corresponding to the ATU-C 22, splitters 92, 94 respectively connected to a PSTN switch 60 and a telephone 80 between ATU-C 22 and ATU-R 30, and a terminal 70 and telephones 82, 82 respectively connected to those ATU-R 30. In this case, the ATU-C 22 and the ATU-R 30 comprise a plurality of ADSL transmit-receive unit 24 according to the present. Also, the ATU-R 30 of the subscriber comprises a V channel section 25 as occasion demands.

Figure 3:
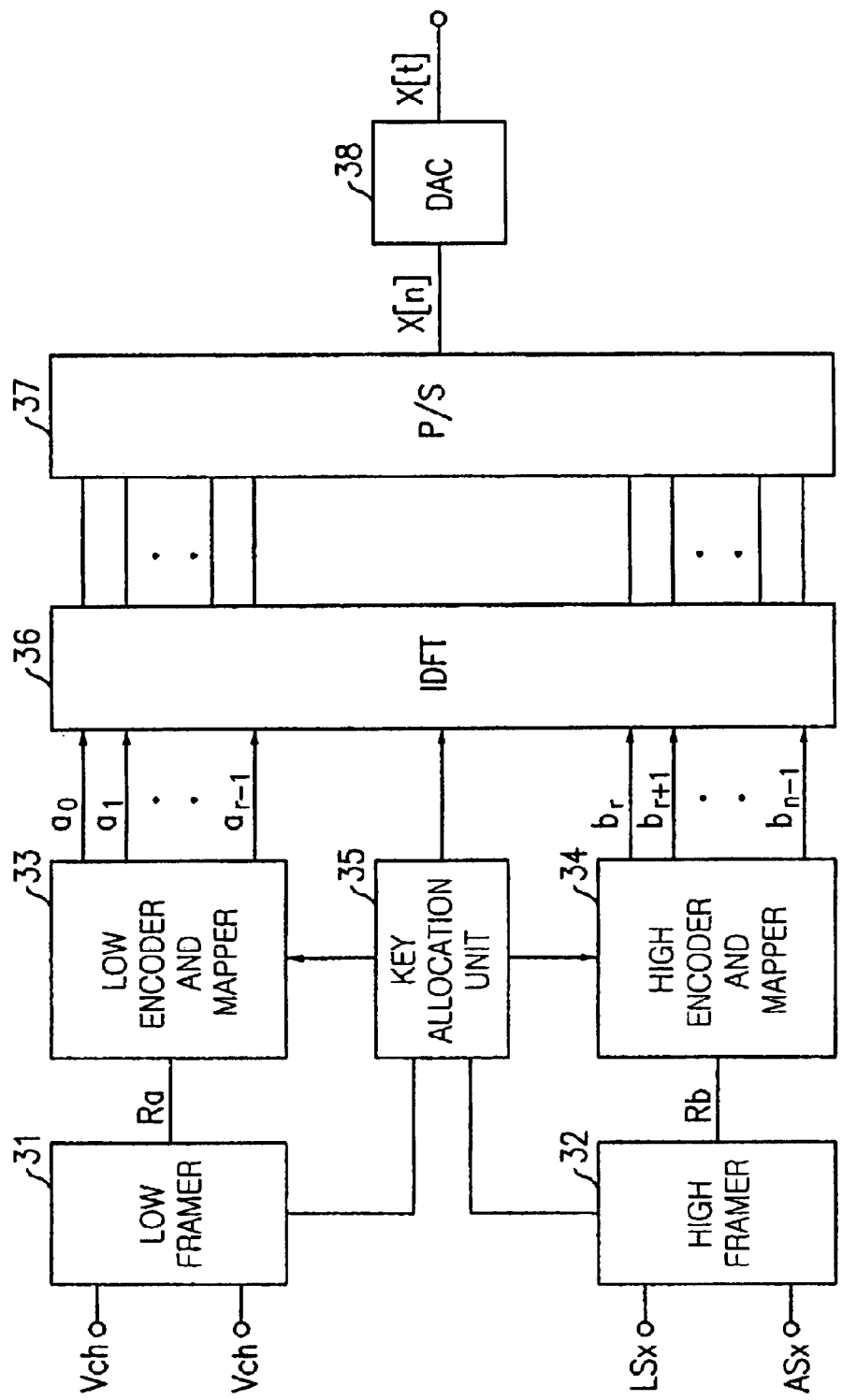
FIG. 3 is a detailed view for illustrating a modulation and transmission section of the symmetric digital subscriber line transmitter/receiver in FIG. 2.

FIG. 3 is a detailed view for illustrating a modulation and transmission section of the asymmetric digital subscriber line transmitter/receiver in FIG. 2.

As shown in FIG. 3, the modulation and transmission section comprises a low framer 31 for forming a low frame after it receives low signals of the POTS and the ISDN through terminals $V_{ch1}$ and $V_{ch2}$, a high framer 32 for forming a high frame after it receives high signals of the packet and the multi frame through terminals LSx and ASx, a low encoder and mapper 33 for coding the serially inputted low frame as predetermined symbols of r numbers and for mapping the symbols as a signal $a_k$, an inverse discrete Fourier transformer (IDFT) 36 for generating a product signal of the inputted signal and an orthogonal function corresponding to a subcarrier by accomplishing an inversed discrete Fourier transformation concerning output signals $a_0 \sim a_{r-1}$ and $b_r \sim b_{n-1}$ of a high encoder and mapper 34, a parallel-serial converter (P/S) 37 for converting the signals which is parallely inputted from the inverse discrete Fourier transformer 36 into serial signals and for outputting a transmission signal X[n], and a digital to analog converter (DAC) 38 for converting the output signal X[n] into an analog signal X[t].

Figure 4:
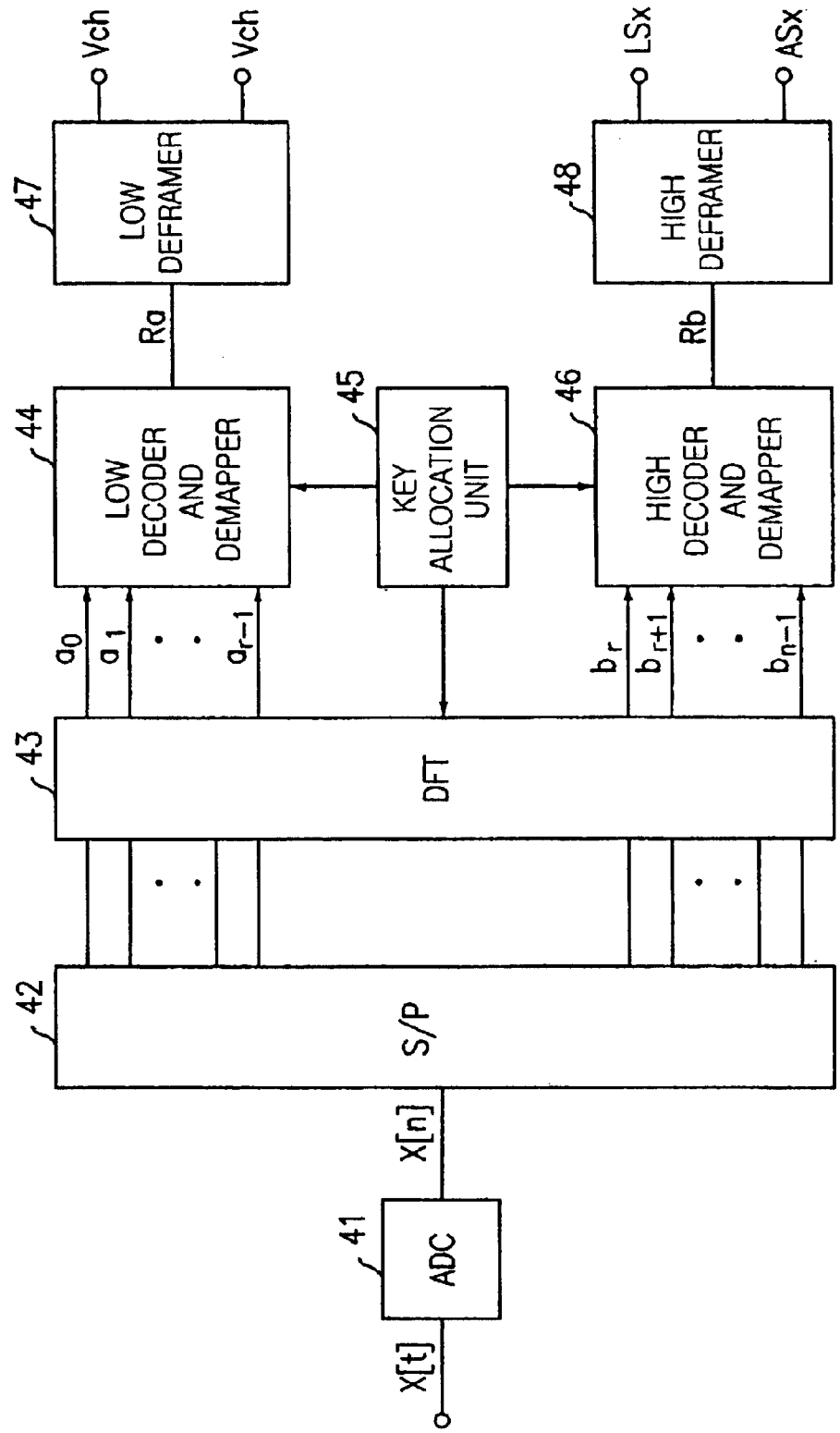
FIG. 4 is a detailed view for illustrating a demodulation/receiving unit of the asymmetric digital subscriber line transmitter/receiver in FIG. 2.

FIG. 4 is a detailed view for illustrating a demodulation/receiving unit of the asymmetric digital subscriber line transmitter/receiver in FIG. 2.

Referring to FIG. 4, the demodulation/receiving unit comprises an analog to digital converter (ADC) 41 for converting the received analog signal X[t] into a digital signal X[n], a serial-parallel converter (S/P) 42 for converting the serially inputted signal X[n] into a parallel signal, a discrete Fourier transformer (DFT) 43 for discretely Fourier transforming the output signal of the S/P 42, a low decoder and demapper 44 for decoding the signals $a_0 \sim a_{r-1}$ as symbols of r numbers and for demapping the symbols of r numbers as a signal $a_k$, a high decoder and demapper 45 for decoding the signals $b_r \sim b_{n-1}$ as symbols of n-r numbers and for demapping the symbols of n-r numbers as a signal $b_k$, a low deframer 47 for separately outputting low signals of the POTS and the ISDN through the terminals $V_{ch1}$ and $V_{ch2}$ after it inversely multiplexing the low frame, a high deframer 48 for outputting signals of the packet and the multi frame through the terminals LSx and ASx after it inversely multiplexing the high frame.

The operation of the ADSL transmitter/receiver by using the dual link DMT according to the present invention will be described with reference to the attached drawings.

The ADSL transmitter/receiver of the present invention comprises the modulation/transmission unit and the demodulation/receiving unit. The ADSL transmitter/receiver has the dual link composed of the low link and the high link which are separated from each other. The packet and the multi frame are transmitted to the high link and the POTS and the ISDN signals are transmitted to the low link. At that time, the modulation/transmission unit in FIG. 3 separates the high signals of the packet and the multi frame from the low signals of the general telephone and the integrated service digital network so that the modulation/transmission unit dissolves them into partial signals of r numbers determined by the key allocation units 35, 45 and separate signals of 255-r numbers. Then, the modulation/transmission unit generates the transmission signal X[n] through the modulation process.

In the meantime, the demodulation/receiving unit demodulates the received signal X[n] so as to restore the original signal as opposed to the operation of the modulation/transmission unit.

The low framer 31 receives the signals of the POTS and the ISDN such as a private line of about 64 Kbps, a telephone line or a V5 common signaling channel (CSC) to map the signal at the low frame, and then the low framer forms the low frame. In this case, the low frame at least comprises a header, a common signaling channel (CSC) and a $V_{ch1}$ channel. The $V_{ch}$ channels are additionally allocated to the low frame by the 8 bits octet unit as occasion demands. The low frame having 4 $V_{ch}$ channels is configured by 6 octets as the following table 2. At that time, the low deframer 47 works on the contrary the low framer 31.

TABLE 2

| Header | CSC | $V_{ch1}$ | $V_{ch2}$ | $V_{ch3}$ | $V_{ch4}$ |
| --- | --- | --- | --- | --- | --- |

The high framer 32 forms the high frame by the same operation as the low framer 31 after the high framer 32 receives the multi frame mode frame and the packet mode of the ASDL such as a video on-demanded (VOD), a high speed Internet and an ATM network connection.

The channels transmitted through the Ra link and the $R_b$ link are showed in table 3. In this case, the high deframer 48 corresponding to the high framer 32 woks opposite to the high framer 32.

TABLE 3

| ADSL link | channel | transmission characteristic | accommodation service |
| --- | --- | --- | --- |
| low link ($R_a$) | Vch1~ Vch4 | 64 kb/s duplex | POTS, ISDN |
| | CSC | 64 kb/s duplex | call processing signal, CSC signal of IDLC |
| high link ($R_b$) | AS0~AS3 | downstream of below 6 Mb/s | VOD, high speed ATM |
| | LS0~LS2 | 640 kb/s duplex | duplex ATM, ISDN BRA |

As it is shown in table 3, the low frame has duplex voice grade channels $V_{ch1}$–$V_{ch4}$ of below 64 kb/s accommodating the signals of the POTS and the ISDN and the duplex channel of below 64 kb/s accommodating a call processing signal and a CSC signal of the IDLC. Also, the high frame has single way channels AS0–AS3 of below 6 Mb/s accommodating signals of a VOD and a high speed ATM and duplex channels LS0–LS2 of below 640 kb/s accommodating the channel of an duplex ATM and an ISDN B-channel.

The low encoder and mapper 33 codes the serially inputted low frame as symbols of r numbers and maps the symbols of $a_k$ of from k=0 to k=(r-1) when it receives a key value r from the key allocation unit 35. When the key value r is increased in order to control the traffic, the number previous to the traffic control is maintained without increasing the number of the symbols of the low signal and the number of the low subcarrier. At that time, the low decoder and demapper 44 corresponds to the low encoder and mapper 33 and works opposite to the low encoder and mapper 33. In this case, a central frequency $f_c$ of the subcarrier is expressed according to the value of k as the following mathematical expression (4).

$$f_c = 4.312(k+1) KHz \quad (4)$$

where $0 \leq k \leq r-1$.

The high encoder and mapper 34 codes the serially inputted high frame as symbols of 255-r numbers to map as symbol $b_k$. At that time, the high encoder and mapper 34 maps the symbols to $b_k$ of from k=r to k=(n-1) when the high encoder and mapper 34 receives the key value r from the key allocation unit 35. In this case, while the central frequency $f_c$ of the subcarrier is the same as that of the mathematical expression (4), the value of k becomes $r \leq k \leq n-1$. Meanwhile, the high decoder and demapper 46 corresponds to the high encoder and mapper 34 and operates opposite to the high encoder and mapper 34.

Subsequently, the inverse discrete Fourier transformer 36 of the modulation/transmission unit executes the inverse discrete Fourier transformation according to the following mathematical expression (5).

$$X[n]=\alpha_0\phi_0[n]+\alpha_1\phi_1[n]+\ldots \alpha_{r-1}\phi_{r-1}[n]+\beta_r\phi_r[n]+\beta_{r-1}\phi_{r-1}[n]+\ldots+\beta_{n-1}\phi_{n-1}[n] \quad (5)$$

wherein the orthogonal function $\phi_k[n]$ equals to $\exp(jk\cdot 2\pi/N\cdot n)$.

At that time, the facility of the orthogonal function $\phi_k[n]$ corresponding to the subcarrier for modulation and demodulation process does not change when the signal source is divided into the low and the high signals. The number of subcarriers corresponding to the low signal sequence and the high signal sequence are determined based on the key value received from the key allocation unit 35. According to the recommendation of the T1E1.4 of the ANSI, the frequency interval of the subcarrier is 4.3125 KHz. Hence, the central frequency of the rth subcarrier should be r·4.3125 KHz. In order to utilize the normalized coefficient in the transformation and the inverse transformation, the following mathematical expression (6) can be obtained when $1\sqrt{N}\cdot a_k$ and $1\sqrt{N}\cdot b_k$ are respectively used instead of $\alpha_k$ and $\beta_k$.

$$X[n] = \sum_{k=0}^{r-1} \frac{1}{\sqrt{N}} \cdot a_k \cdot \exp\left(jk \cdot \frac{2\pi}{N} \cdot n\right) + \sum_{k=r}^{n-1} \frac{1}{\sqrt{N}} \cdot b_k \cdot \exp\left(jk \cdot \frac{2\pi}{N} \cdot n\right), 0 \le r \le n-1 \quad (6)$$

wherein $0 \le r \le n-1$ and N means the total number of the subcarriers.

The inverse discrete transformer 36 generates the sum of product corresponding to each articles of the mathematical expression (6) and the final transmission signal X[n] can be obtained through the parallel-serial transformer 37.

Then, the discrete Fourier transformer 43 of the demodulation/receiving unit in FIG. 4 executes the Fourier transformation and generates the signals of $a_k$ and $b_k$ according to the following mathematical expressions (7) and (8).

$$a_k = \frac{1}{\sqrt{N}} \sum_{n=<N>} X[n] \cdot \exp\left(-jk \cdot \frac{2\pi}{N} \cdot n\right), 0 \le k \le r-1 \quad (7)$$

$$b_k = \frac{1}{\sqrt{N}} \sum_{n=<N>} X[n] \cdot \exp\left(-jk \cdot \frac{2\pi}{N} \cdot n\right), r \le k \le n-1 \quad (8)$$

The discrete Fourier transformer 43 calculates the signals $a_k$ and $b_k$ from the inputted signal X[n] by the serial-parallel transformer 42 as the mathematical expressions (7) and (8).

The key allocation units 35, 45 decide the subcarrier dividing key r which becomes the criterion for distinguishing the low signal from the high signal, and they notify the key to the low encoder and mapper 33, the high encoder and mapper 34 and the inverse discrete Fourier transformer 36 (the discrete Fourier transformer 43, the low decoder and demapper 44 and the high decoder and demapper 45). At that time, the bandwidth of the high link becomes narrow according as the value of r increases. Therefore, the traffic for respective the subscriber can be controlled by adjusting the value of the dividing key r.

The V channel section 25 in FIG. 2 is connected to the terminal $V_{ch1}$ or $V_{ch2}$ in FIG. 3 as the point of contact and is added as occasion demands. In this case, the V channel section 25 converts the telephone signal to a pulse code modulation (PCM) signal so that the V channel section 25 transfers the PCM signal to the specified channel of the low framer 31. On the contrary, the V channel section 25 converts the PCM signal to the telephone signal. In this case, a hook off and a hook on signals of the telephone and maintenance data are converted to message forms, and then transferred through the CSC channel of the low frame. The splitter is needless for the ATU-R having the V channel section.

As it is described above, the conventional ADSL comprises a downstream and a upstream. The present invention, however, comprises the low and the high data links which are separated from each other. Thus, the ADSL of the present invention can accommodates the PTOS signal limited by the time according to the DMT-typed modulation demodulation process that the signals of the PTOS and the ISDN are transmitted and received through the low link and the packet and the multi frame are transmitted and received through the high link. Also, the present invention can control the ADSL traffic by adjusting the value of the dividing key.

While the present invention has been particularly shown and described with reference to particular embodiment thereof, it will be understood by those skilled in the art that various changes in form and detail may be effected therein without departing from the spirit and scope of the invention as defined by the appended claims.

What is claimed is:

1. An apparatus having a modulation device and demodulation device and for communicating signals in an asymmetric digital subscriber line network, said modulation device comprising:
   means for generating a control signal based on a predetermined data, including:
      means for determining the control signal based on amounts of a low rate signal and a high rate signal;
   means for receiving the low rate signal and for generating a low rate signal sequence having a first controlled number of bits, based on the control signal;
   means for receiving the high rate signal through terminals LSx and ASx and for generating a high rate signal sequence having a second controlled number of bits, based on the control signal; and
   means for modulating the low rate signal sequence and the high rate signal sequence and for coupling modulated low rate signal sequence and modulated high rate signal sequence, thereby generating a transmission signal.

2. The apparatus as claimed in claim 1, wherein the transmission signal is expressed as follows:

$$X[n] = \sum_{k=0}^{r-1} \frac{1}{\sqrt{N}} \cdot a_k \cdot \exp\left(jk \cdot \frac{2\pi}{N} \cdot n\right), 0 \le k \le r-1 + \sum_{k=r}^{n-1} \frac{1}{\sqrt{N}} \cdot b_k \cdot \exp\left(jk \cdot \frac{2\pi}{N} \cdot n\right), r \le k \le n-1$$

wherein X[n] is the transmission signal, r is the key value, n is the total number of subcarriers assigned to the subscriber, k is a positive integer number indicating order of symbols a and b, $a_k$ $0 \le k \le r-1$ is a value of the low rate signal, $b_k$ $r \le k \le n-1$ is a value of the high rate signal, $$\exp\left(jk \cdot \frac{2\pi}{N} \cdot n\right)$$

corresponds to a subcarrier respectively and N is a total number of subcarriers.

3. The apparatus as claimed in claim 2, wherein a maximum value of a sum of the first controlled number and the second controlled number is the same as a total number of subcarriers assigned to a subcarrier.

4. The apparatus as claimed in claim 1, wherein said means for receiving the low rate signals includes:
   a low framer for receiving the low rate signal and for generating a low frame; and
   a low encoder and mapper for encoding the low frame to the first controlled number of low symbols and mapping the low symbols to a high rate sequence.

5. The apparatus as claimed in claim 1, wherein said means for receiving the high rate signal(s) includes:
   a high framer for receiving the high rate signal and for generating a high frame; and
   a high encoder and mapper for encoding the high frame to the second controlled number of high symbols and mapping the high symbols to a high rate signal sequence.

6. The apparatus as claimed in claim 1, wherein said means for modulating includes:
   an inverse discrete Fourier transformer for performing an inverse discrete Fourier transformation of the low rate signal sequence and the high rate signal sequence; and
   a parallel-to-serial converter for converting outputs inputted from the inverse discrete Fourier transformer in parallel to serial signals.

7. An apparatus having a modulation device and demodulation device and for communicating signals in an asymmetric digital subscriber line network, said demodulation device comprising:
   means for generating a control signal based on a predetermined data, including:
      means for determining the control signal based on amounts of a low rate signal and a high rate signal;
      means for receiving and demodulating a transmission signal and for generating a low rate signal sequence having a first controlled number of bits and a high rate signal sequence having a second controlled number of bits, based on the control signal;
      means for receiving the low rate signal sequence and generating the low rate signal; and
      means for receiving the high rate signal sequence and generating the high rate signal to terminals LSx and ASx.

8. The apparatus as claimed in claim 7, wherein the low rate signal sequence and the high rate signal sequence is expressed as following equations:

$$a_k = \frac{1}{\sqrt{N}} \sum_{n=<N>} X[n] \cdot \exp\left(-jk \cdot \frac{2\pi}{N} \cdot n\right), 0 \leq k \leq r-1$$

$$b_k = \frac{1}{\sqrt{N}} \sum_{n=<N>} X[n] \cdot \exp\left(-jk \cdot \frac{2\pi}{N} \cdot n\right), r \leq k \leq n-1$$

wherein X[n] is the transmission signal, r is the key value, n is the total number of subcarriers assigned to the subscriber, k is a positive integer number indicating order of symbols a and b, $a_k$ $0 \leq k \leq r-1$ is a value of the low rate signal, $b_k$ $r \leq k \leq n-1$ is a value of the high rate signal, $$\exp\left(jk \cdot \frac{2\pi}{N} \cdot n\right)$$

corresponds to a subcarrier respectively and N is a total number of subcarriers.

9. The apparatus as claimed in claim 8, wherein a maximum value of a sum of the first controlled number and the second controlled number is the same as a total number of subcarriers assigned to a subscriber.

10. The apparatus as claimed in claim 7, wherein said means for receiving the low rate signal sequence includes:
    means for demapping the low rate signal sequence to the first controlled number of low symbols and decoding the low symbol to a low frame; and
    means for receiving the low frame and generating the low rate signal.

11. The apparatus as claimed in claim 7, wherein said means for receiving the high rate signal sequence includes:
    means for demapping the high rate signal sequence to the second controlled number of high symbols and decoding the high symbol to a high frame; and
    means for receiving the high frame and generating the high rate signal.

12. The apparatus as claimed in claim 7, wherein said means for receiving and demodulating the transmission signal includes:
    a serial-to-parallel converter for converting the transmission signal which is a serial signal to a parallel signal; and
    a discrete Fourier transformer for performing a discrete Fourier transformation of the parallel transmission signal.

13. An apparatus for communicating signals in an asymmetric digital subscriber line network, comprising:
    a modulation device; and
    a demodulation device,
    wherein said modulation device includes:
       means for generating a control signal based on a predetermined data, including;
          means for determining the control signal based on amounts of a low rate signal and a high rate signal;
          means for receiving the low rate signal and for generating a low rate signal sequence having a first controlled number of bits, based on the first control signal;
          means for receiving the high rate signal through terminals LSx and ASx and for generating a high rate signal sequence having a second controlled number of bits, based on the first control signal; and
          means for modulating the low rate signal sequence and the high rate signal sequence and for coupling the modulated low rate signal sequence and the modulated high rate signal sequence, thereby generating a transmission signal,
    wherein said demodulation device includes:
       means for generating a second control signal based on a predetermined data;
       means for receiving and demodulating the transmission signal and for generating the low rate signal sequence having the first controlled number of bits and the high rate signal sequence having the second controlled number of bits, based on a second control signal;

means for receiving the low rate signal sequence and generating the low rate signal; and means for receiving the high rate signal sequence and generating the high rate signal to the terminals LSx and ASx.

14. The apparatus as claimed in claim 13, wherein the first control signal has the same value as the second control signal.

15. The apparatus as claimed in claim 13, wherein a maximum value of a sum of the first controlled number and the second controlled number is the same as a total number of subcarriers assigned to a subscriber.

16. The apparatus as claimed in claim 13, wherein said means for receiving the low rate signal(s) includes:

a low framer for receiving the low rate signal and for generating a low frame; and a low encoder and mapper for encoding the low frame to the first controlled number of low symbols and mapping the low symbols to a high rate sequence.

17. The apparatus as claimed in claim 13, wherein said means for receiving the high rate signal(s) includes:

a high framer for receiving the high rate signal and for generating a high frame; and a high encoder and mapper for encoding the high frame to the second controlled number of high symbols and mapping the high symbols to a high rate signal sequence.

18. The apparatus as claimed in claim 13, wherein said means for modulating includes:

an inverse discrete Fourier transformer for performing an inverse discrete Fourier transformation of the low rate signal sequence and the high rate signal sequence; and a parallel-to-serial converter for converting outputs inputted from the inverse discrete Fourier transformer in parallel to serial signals.

19. The apparatus as claimed in claim 13, wherein means for receiving the low rate signal sequence includes:

means for demapping the low rate signal sequence to the first controlled number of low symbols and decoding the low symbol to a low frame; and means for receiving the low frame and generating the low rate signal.

20. The apparatus as claimed in claim 13, wherein means for receiving the high rate signal sequence includes:

means for demapping the high rate signal sequence to the second controlled number of high symbols and decoding the high symbol to a high frame; and means for, receiving the high frame and generating the high rate signal.

21. The apparatus as claimed in claim 13, wherein means for receiving and demodulating the transmission signal includes:

a serial-to-parallel converter for converting the transmission signal which is a serial signal to a parallel signal; and a discrete Fourier transformer for performing a discrete Fourier transformation of the parallel transmission signal.

22. A method for communicating signals applied to an apparatus having a modulation device and demodulation device in an asymmetric digital subscriber line network, the method comprising:

generating a control signal based on a predetermined data;

receiving a low rate signal and generating a low rate signal sequence having a first controlled number of bits, based on the control signal;

receiving a high rate signal through terminals LSx and ASx and generating a high rate signal sequence having a second controlled number of bits, based on the control signal; and modulating the low rate signal sequence and the high rate signal sequence and coupling the modulated low rate signal sequence and the modulated high rate signal sequence, thereby generating a transmission signal, wherein the transmission signal is expressed as follows:

$$X[n] = \sum_{k=0}^{r-1} \frac{1}{\sqrt{N}} \cdot a_k \cdot \exp\left(jk \cdot \frac{2\pi}{N} \cdot n\right), 0 \leq k \leq r-1 +$$

$$\sum_{k=0}^{r-1} \frac{1}{\sqrt{N}} \cdot b_k \cdot \exp\left(jk \cdot \frac{2\pi}{N} \cdot n\right), r \leq k \leq n-1$$

wherein X[n] is the transmission signal, r is the key value, n is the total number of subcarriers assigned to the subscriber, k is a positive integer number indicating order of symbols a and b, $a_k$, $0 \leq k \leq r-1$ is a value of the low rate signal, $b_k$ $r \leq k \leq n-1$ is a value of the high rate signal, $$\exp\left(jk \cdot \frac{2\pi}{N} \cdot n\right)$$

corresponds to a subcarrier respectively and N is a total number of subcarriers, wherein a maximum value of a sum of the first controlled number and the second controlled number is the same as a total number of subcarriers assigned to a subscriber.

23. A method for communicating signals applied to an apparatus having a modulation device and demodulation device and in an asymmetric digital subscriber line network, the method comprising the steps of:

generating a control signal based on a predetermined data;

receiving and demodulating a transmission signal and generating a low rate signal sequence having a first controlled number of bits and a high rate signal sequence having a second controlled number of bits, based on the control signal;

receiving the low rate signal sequence and generating the low rate signal; and receiving the high rate signal sequence and generating the high rate signal to terminals LSx and Asx, wherein the low rate signal sequence and the high rate signal sequence is expressed as following equations:

$$a_k = \frac{1}{\sqrt{N}} \sum_{n=<N>} X[n] \cdot \exp\left(-jk \cdot \frac{2\pi}{N} \cdot n\right), 0 \leq k \leq r-1$$

$$b_k = \frac{1}{\sqrt{N}} \sum_{n=<N>} X[n] \cdot \exp\left(-jk \cdot \frac{2\pi}{N} \cdot n\right), r \leq k \leq n-1$$

wherein X[n] is the transmission signal, r is the key value, n is the total number of subcarriers assigned to the subscriber, k is positive integer number indicating order of symbols a and b, $a_k$ $0 \leq k \leq r-1$ is a value of the low rate signal, $b_k$ $r \leq k \leq n-1$ is a value of the high rate signal, $$\exp\left(jk \cdot \frac{2\pi}{N} \cdot n\right)$$

corresponds to a subcarrier respectively and N is a total number of subcarriers, wherein a maximum value of a sum of the first controlled number and the second controlled number is the same as a total number of subcarriers assigned to a subscriber.

24. A method for communicating signals in an asymmetric digital subscriber line network, comprising:

generating a first control signal based on a predetermined data;

receiving a low rate signal and generating a low rate signal sequence having a first controlled number of bits, based on the first control signal;

receiving a high rate signal through terminals LSx and ASx and generating a high rate signal sequence having a second controlled number of bits, based on the first control signal;

modulating the low rate signal sequence and the high rate signal sequence and coupling the modulated low rate signal sequence and the modulated high rate signal sequence, thereby generating a transmission signal, transmitting the transmission signal;

generating a second control signal based on a predetermined data;

receiving and demodulating the transmission signal and generating a low rate signal sequence having the first controlled number of bits and the high rate signal sequence having the second controlled number of bits, based on the second control signal;

receiving the low rate signal sequence and generating the low rate signal; and receiving the high rate signal sequence and generating the high rate signal to the terminals LSx and ASx, wherein the first control signal has the same value as the second control signal and a maximum value of a sum of the first controlled number and the second controlled number is the same as a total number of subcarriers assigned to a subscriber.

\* \* \* \* \*